United States Patent
Tai et al.

(10) Patent No.: US 11,842,265 B2
(45) Date of Patent: *Dec. 12, 2023

(54) PROCESSOR CHIP AND CONTROL METHODS THEREOF

(71) Applicant: SAMSUNG ELECTRONICS CO., LTD., Suwon-si (KR)

(72) Inventors: Yongmin Tai, Suwon-si (KR); Insang Cho, Suwon-si (KR); Wonjae Lee, Hwaseong-si (KR); Chanyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,130

(22) Filed: Jun. 19, 2020

(65) Prior Publication Data

US 2021/0049450 A1     Feb. 18, 2021

Related U.S. Application Data

(63) Continuation of application No. 16/747,989, filed on Jan. 21, 2020, now Pat. No. 11,681,904.

(30) Foreign Application Priority Data

Aug. 13, 2019 (KR) .................. 10-2019-0099124

(51) Int. Cl.
*G06N 3/063* (2023.01)
*G06F 12/14* (2006.01)

(52) U.S. Cl.
CPC ......... *G06N 3/063* (2013.01); *G06F 12/1458* (2013.01); *G06F 2212/1052* (2013.01)

(58) Field of Classification Search
CPC ................ G06N 3/063; G06F 12/1458; G06F 2212/1052
See application file for complete search history.

(56) References Cited

U.S. PATENT DOCUMENTS 4,697,212 A    9/1987   Osawa
6,654,730 B1   11/2003   Kato et al.
(Continued)

FOREIGN PATENT DOCUMENTS

CN    108255773     7/2018
CN    109657788     4/2019
(Continued)

OTHER PUBLICATIONS

Wang, Software Support for Heterogeneous Computing, Aug. 9, 2018, 2018 IEEE Computer Society Annual Symposium on VLSI (Year: 2018).*

(Continued)

*Primary Examiner* — Kakali Chaki
*Assistant Examiner* — Su-Ting Chuang
(74) *Attorney, Agent, or Firm* — Nixon & Vanderhye P.C.

(57) ABSTRACT

Disclosed in a processor chip configured to perform neural network processing. The processor chip includes a memory, a first processor configured to perform neural network processing on a data stored in the memory, a second processor and a third processor, and the second processor is configured to transmit a control signal to the first processor and the third processor to cause the first processor and the third processor to perform an operation.

15 Claims, 11 Drawing Sheets

(56) References Cited

U.S. PATENT DOCUMENTS

| | | | |
|---|---|---|---|
| 7,219,085 | B2 | 5/2007 | Buck et al. |
| 7,502,928 | B2 | 3/2009 | Suzuoki et al. |
| 7,895,587 | B2 | 2/2011 | Babaian |
| 8,001,377 | B2 | 8/2011 | Suzuoki et al. |
| 9,076,001 | B1* | 7/2015 | Jagmag .................... G06F 21/74 |
| 9,606,818 | B2 | 3/2017 | Plondke |
| 10,223,635 | B2 | 3/2019 | Annapureddy et al. |
| 10,474,600 | B2 | 11/2019 | Malladi et al. |
| 10,489,887 | B2 | 11/2019 | El-Khamy et al. |
| 10,657,274 | B2 | 5/2020 | Cho |
| 10,713,143 | B1* | 7/2020 | Vemulapati ........... G06F 9/5055 |
| 10,755,126 | B2 | 8/2020 | Son et al. |
| 10,936,942 | B2 | 3/2021 | Dasari |
| 11,055,816 | B2* | 7/2021 | Chae ........................ G06T 7/90 |
| 11,113,104 | B2 | 9/2021 | Wu et al. |
| 11,508,146 | B2 | 11/2022 | Son et al. |
| 11,514,290 | B2 | 11/2022 | Son et al. |
| 2005/0125369 | A1 | 6/2005 | Buck et al. |
| 2006/0112213 | A1 | 5/2006 | Suzuoki et al. |
| 2007/0006193 | A1* | 1/2007 | Babaian ................ G06F 9/5066 717/149 |
| 2009/0125717 | A1 | 5/2009 | Suzuoki et al. |
| 2014/0101405 | A1 | 4/2014 | Papadopoulou et al. |
| 2014/0282508 | A1* | 9/2014 | Plondke ................ G06F 12/109 718/1 |
| 2016/0321784 | A1 | 11/2016 | Annapureddy |
| 2016/0379004 | A1* | 12/2016 | Cho ....................... G06F 3/0655 726/26 |
| 2018/0129893 | A1 | 5/2018 | Son |
| 2018/0174268 | A1 | 6/2018 | Bittner et al. |
| 2018/0285715 | A1 | 10/2018 | Son |
| 2018/0293707 | A1 | 10/2018 | El-Khamy et al. |
| 2019/0080239 | A1 | 3/2019 | Yang |
| 2019/0114541 | A1 | 4/2019 | Yang |
| 2019/0156187 | A1 | 5/2019 | Dasari |
| 2019/0180177 | A1 | 6/2019 | Yim et al. |
| 2019/0188917 | A1* | 6/2019 | Cho ....................... G06T 15/506 |
| 2019/0206026 | A1 | 7/2019 | Vemulapalli et al. |
| 2019/0251471 | A1* | 8/2019 | Morita .................. G06F 16/583 |
| 2020/0082279 | A1* | 3/2020 | Arora ....................... G06N 3/08 |
| 2020/0090305 | A1 | 3/2020 | El-Khamy et al. |
| 2020/0104722 | A1 | 4/2020 | Wu |
| 2020/0242734 | A1* | 7/2020 | Wang ........................ G06T 1/20 |
| 2020/0372276 | A1 | 11/2020 | Son et al. |
| 2020/0379923 | A1* | 12/2020 | Lidman ............... G06F 12/1458 |
| 2021/0165883 | A1 | 6/2021 | Zhang |
| 2021/0380127 | A1 | 12/2021 | Woo et al. |

FOREIGN PATENT DOCUMENTS

| | | | |
|---|---|---|---|
| EP | 3 389 005 A1 | 10/2018 | |
| JP | 2001-188767 A | 7/2001 | |
| JP | 2015-530683 A | 10/2015 | |
| JP | 2018-523182 A | 8/2018 | |
| JP | 2018-152639 | 9/2018 | |
| JP | 2019-053734 A | 4/2019 | |
| JP | 6629678 B2 * | 1/2020 | ........... G06F 16/583 |
| KR | 10-2005-0056124 | 6/2005 | |
| KR | 10-2008-0060649 | 7/2008 | |
| KR | 10-0924043 | 10/2009 | |
| KR | 10-2017-0106338 A | 9/2017 | |
| KR | 2018-0114488 | 10/2018 | |
| KR | 10-2019-0030034 | 3/2019 | |
| KR | 10-2019-0043419 | 4/2019 | |
| KR | 10-2020-0084949 A | 7/2020 | |

OTHER PUBLICATIONS

Yoo, 1.2 Intelligence on Silicon: From Deep-Neural-Network Accelerators to Brain Mimicking AI-SoCs, Mar. 7, 2019, 2019 IEEE International Solid-State Circuits Conference—(ISSCC) (Year: 2019).*

Kanonov ("Secure Containers in Android: the Samsung Knox Case Study") arXiv:1605.08567v1 [cs.CR] May 27, 2016 (Year: 2016).*

Wan ("Satin: A Secure and Trustworthy Asynchronous Introspection on Multi-Core ARM Processors") 2019 49th Annual IEEE/IFIP International Conference on Dependable Systems and Networks (DSN) (Year: 2019).*

Lapid ("Navigating the Samsung TrustZone and Cache-Attacks on the Keymaster Trustlet") Computer Security 23rd European Symposium on Research in Computer Security, ESORICS 2018, Barcelona, Spain, Sep. 3-7, 2018 (Year: 2018).*

Wan2 ("Remotely Controlling TrustZone Applications? A Study on Securely and Resiliently Receiving Remote Commands") WiSec '21, Jun. 28-Jul. 2, 2021, Abu Dhabi, United Arab Emirates (Year: 2021).*

U.S. Appl. No. 16/747,989, filed Jan. 21, 2020; Tai et al.

PCT Search Report dated May 13, 2020 for International Application No. PCT/KR2020/001010 filed Jan. 21, 2020.

PCT Written Opinion dated May 13, 2020 for International Application No. PCT/KR2020/001010 filed Jan. 21, 2020.

Office Action with English translation for KR10-2019-0099124, dated Jan. 2, 2020, 8 pages.

Japanese Office Action dated Jul. 6, 2021 for JP Application No. 2020-066302.

Extended European Search Report dated Aug. 7, 2020 for EP Application No. 20154613.2.

Ignatov et al., "AI Benchmark: Running Deep Neural Networks on Android Smartphones", Jan. 23, 2019, ROBOCUP 2008, pp. 288-314.

Japanese Office Action dated Mar. 8, 2022 for JP Application No. 2020-066302.

European Search Report dated Nov. 9, 2021 for EP Application No. 20154613.2.

Non-Final Office Action dated May 11, 2022 for U.S. Appl. No. 16/747,989; Tai et al.

Notice of Allowance dated Nov. 1, 2022 for U.S. Appl. No. 16/747,989; Tai et al.

JP Notice of Allowance dated Oct. 11, 2022 for JP 2020-066302.

Notice of Allowance for U.S. Appl. No. 16/747,989 dated Feb. 15, 2023; Tai et al.

* cited by examiner

Application A

Application B

PROCESSOR CHIP AND CONTROL METHODS THEREOF

CROSS-REFERENCE TO RELATED APPLICATION

This application is a continuation of application Ser. No. 16/747,989, filed Jan. 21, 2020, which claims priority to Korean Patent Application No. 10-2019-0099124, filed on Aug. 13, 2019, the entire contents of each of which are all hereby incorporated herein by reference in their entireties.

BACKGROUND

1. Field

The disclosure relates to a processor chip and control methods thereof, for example to a processor chip performing neural network processing and control methods thereof.

2. Description of Related Art

Recently, electronic apparatuses that provide various experiences using Neural Network technology such as Deep Learning are being developed. Specifically, performances of Segmentation, Super-Resolution, HDR, or the like are being improved using Neural Network technology.

Technologies for improving image quality using the Neural Network technology in electronic apparatuses may first be implemented in hardware through a digital circuit design such as a register-transfer level (RTL) or implemented in software using a processor such as a neural processing unit (NPU).

From the above, the method using a processor includes using a processor of various types such as a central processing unit (CPU), digital signal processor (DSP), graphics processing unit (GPU), NPU, or the like. In particular, NPU may be specialized in neural network processing and may output results quickly, and is superior in performance and efficiency compared to processors of different types when performing neural network processing due to a specialized accelerator.

The NPU generally requires control by the CPU, and receives input data and an artificial intelligence model information to be applied to the input data by the CPU in particular. Specifically, as shown in FIG. 1, the CPU initializes NPU and provides the input data and the artificial intelligence model information stored in the memory to the NPU, and operates (triggers) the NPU.

However, based on the electronic apparatus using the content as input data, the CPU cannot directly access the original of the content for the security of the content.

As a method to bypass the above, methods such as using a module copying the original of the content in a secure area (trust zone) to a common area or accessing a downscaled content may be employed. In this case, problems such as overuse of memory, delay in operation time, deterioration of content quality, or the like may occur.

In addition, based on the CPU in the electronic apparatus performing various operations, the CPU may be overloaded if the NPU control is set at each frame unit. That is, based on CPU being used, real-time execution may be difficult.

As indicated above, based on a CPU of an electronic apparatus controlling an NPU, various problems may arise.

SUMMARY

Embodiments of the present disclosure address the above-described necessity, and provide a processor chip for more efficiently controlling a neural processing unit (NPU) and control methods thereof.

According to an example embodiment of the present disclosure a processor chip configured to perform neural network processing includes a memory, a first processor configured to perform the neural network processing on data stored in the memory, a second processor and a third processor, wherein the second processor is configured to transmit a control signal to the first processor and the third processor to cause the first processor and the third processor to perform operations.

In addition, the second processor may be configured to transmit a start signal to the third processor to cause the third processor to provide information on an input content stored in the memory to the first processor, and to transmit an initializing signal to the first processor to cause the first processor to perform neural network processing on an input content based on information on the input content provided from the third processor and artificial intelligence model information stored in the memory.

Further, the memory may be configured to include a secure area where access by the second processor is not possible and an unsecure area where access by the second processor is possible, wherein the second processor may be configured to transmit the start signal to the third processor to cause the third processor to identify address information of the input content by accessing the secure area and to provide address information of the input content to the first processor, and to transmit the initializing signal to the first processor to cause the first processor to perform neural network processing on the input content based on address information of the input content provided from the third processor and the artificial intelligence model information stored in the unsecure area.

In addition, the second processor may be configured to provide address information of one of a plurality of artificial intelligence models stored in the unsecure area to the first processor, and the first processor is configured to obtain the artificial intelligence model information based on address information of the artificial intelligence model provided from the second processor.

Further, the second processor may be configured to transmit the start signal to the third processor to cause the third processor to provide address information of one of a plurality of artificial intelligence models stored in the unsecure area based on the input contents to the third processor, and the first processor may be configured to obtain the artificial intelligence model information based on address information of the artificial intelligence model provided by the third processor.

In addition, a communication interface comprising communication circuitry may be further included, and a plurality of frames included in the input content may be sequentially received through the communication interface and stored in the secure area of the memory, and the second processor may be configured to transmit the start signal to the third processor to cause the third processor to provide address information of the frame sequentially stored in the memory to the first processor at predetermined time intervals.

Further, the second processor, based on a first application being executed, may be configured to transmit the start signal to the third processor to cause the third processor to provide information on the input content to the first processor.

In addition, the second processor, based on the first application being terminated, may be configured to transmit an end signal to the third processor to cause the third processor to stop the provided operations, and the third processor may be configured to control the first processor to stop the neural network processing operation, and may provide a signal indicating that the neural network processing operation is stopped to the second processor.

Further, the second processor, based on a second application being executed, may be configured to access the unsecure area to identify address information of a data corresponding to the second application, to provide the identified address information to the first processor, and to control the first processor to perform neural network processing for the data based on address information of the data provided from the second processor and the artificial intelligence model information stored in the unsecure area.

A display may be further included, and the second processor may be configured to transmit the start signal to the third processor to cause the third processor to identify address information of input content displayed through the display from a plurality of input contents and to provide the identified address information to the first processor.

Further, the first processor may include a neural processing unit (NPU), and the second processor may include a processor configured to operate based on an operating system, and the third processor may include a processor configured to perform a predetermined operations.

According to an example embodiment of the present disclosure, a method of controlling a processor chip including a memory, a first processor performing neural network processing for data stored in the memory, a second processor and a third processor, includes: transmitting, by the second processor, a control signal to the third processor to cause the third processor to perform an operation and transmitting, by the second processor, a control signal to the first processor to cause the first processor to perform an operation.

In addition, the transmitting a control signal to the third processor may include transmitting a start signal to the third processor to cause the third processor to provide information on an input content stored in the memory to the first processor, and transmitting a control signal to the first processor includes transmitting an initializing signal to the first processor to cause the first processor to perform the neural network processing on the input content based on the information on the input content provided from the third processor and artificial intelligence model information stored in the memory.

Further, transmitting a control signal to the third processor may include the third processor accessing a secure area of the memory to identify address information of the input content and transmitting the start signal to the third processor to provide address information of the input content to the first processor, and transmitting a control signal to the first processor includes the first processor transmitting an initializing signal to the first processor to perform the neural network processing on the input content based on address information of the input content provided from the third processor and the artificial intelligence model information stored in the unsecure area of the memory.

In addition, providing address information of one of a plurality of artificial intelligence models stored in the unsecure area to the first processor by the second processor and obtaining the artificial intelligence model information based on the address information of the artificial intelligence model provided from the second processor by the first processor may be further included.

Further, transmitting the control signal to the third processor may include transmitting the start signal to the third processor to cause the third processor to provide address information on one of the plurality of artificial intelligence models stored in the unsecure area based on the input content to the first processor, and the control method may further include obtaining the artificial intelligence model information by the first processor based on address information of the artificial intelligence model provided by the third processor.

In addition, sequentially receiving a plurality of frames included in the input content and being stored in a secure area of the memory may be further included, and transmitting the control signal to the third processor may include transmitting the start signal to the third processor by the third processor to cause the third processor to provide address information of the frame sequentially stored in the memory to the first processor at predetermined time intervals.

Further, transmitting the control signal to the third processor may include, based on the first application being executed, transmitting the start signal to the third processor to cause the third processor to provide information on the input content to the first processor.

In addition, based on the first application being terminated, transmitting an end signal to the third processor from the second processor to cause the third processor to terminate the provided operations, terminating the neural network processing operation by the first processor under control of the third processor, and providing a signal indicating the neural network processing operation being terminated from the third processor to the second processor may be further included.

According to another example embodiment of the present disclosure, a method of controlling a processor chip including a memory, a first processor, a second processor and a third processor includes: transmitting information on data stored in the memory by the second processor to the first processor based on a first application being executed; transmitting a first initializing signal from the second processor to the first processor to cause the first processor to perform neural network processing on the data based on information on the data provided by the second processor and the first artificial intelligence model information stored in the memory; transmitting a start signal to the third processor from the second processor to cause the third processor to provide information on input content stored in the memory to the first processor based on the first application being terminated and a second application being executed; and transmitting a second initializing signal to the first processor from the second processor to cause the first processor to perform neural network processing on the input content based on information on the input content provided from the third processor and a second artificial intelligence model information stored in the memory.

According to the various example embodiments of the present disclosure, the processor chip may reduce memory use based on performing neural network processing on the original content, improve output quality of content, and perform processing in real-time.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
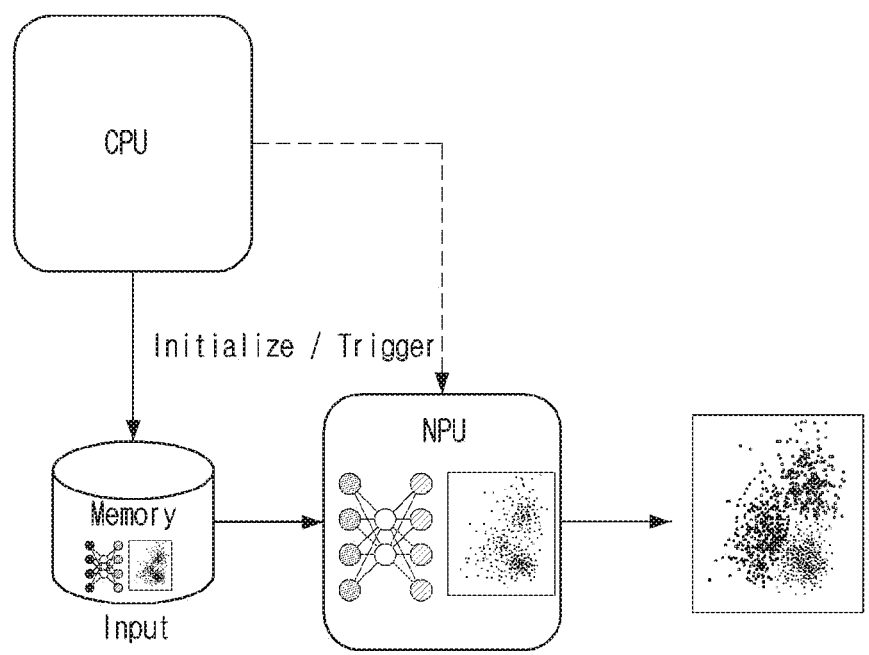
FIG. 1 is a diagram illustrating control methods of a neural processing unit (NPU) according to conventional technology.

Various example embodiments of the present disclosure may be diversely modified. Accordingly, example embodiments are illustrated in the drawings and are described in greater detail in the detailed description. However, it is to be understood that the present disclosure is not limited to an example embodiment, and includes all modifications, equivalents, and substitutions without departing from the scope and spirit of the present disclosure. Also, well-known functions or constructions may not described in detail where they may obscure the disclosure with unnecessary detail.

Hereinafter, the various example embodiments of the present disclosure will be described in greater detail with reference to the accompanying drawings.

Figure 2:
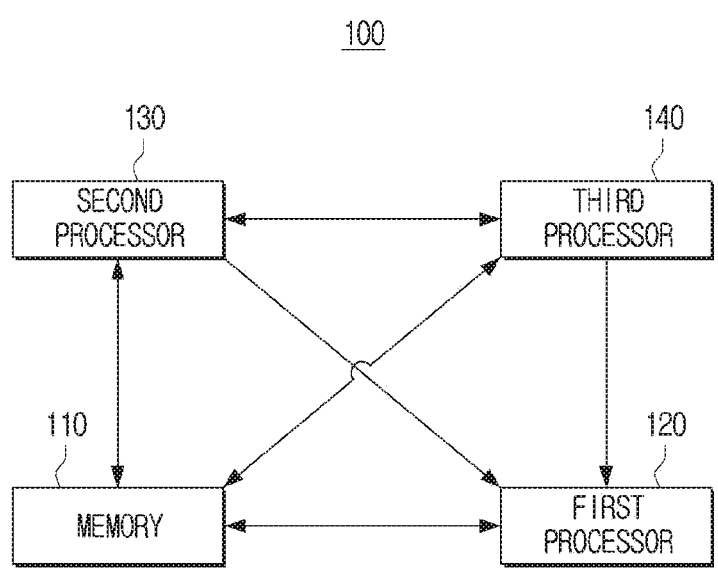
FIG. 2 is a block diagram illustrating an example configuration of a processor chip according to an embodiment of the present disclosure.

FIG. 2 is a block diagram illustrating an example configuration of a processor chip 100 according to an embodiment of the present disclosure.

As shown in FIG. 2, the processor chip 100 includes a memory 110, a first processor (e.g., including processing circuitry) 120, a second processor (e.g., including processing circuitry) 130, and a third processor (e.g., including processing circuitry) 140.

The processor chip 100, as an apparatus performing neural network processing, may be implemented, for example, and without limitation, in a TV, a smartphone, a tablet PC, a mobile phone, a video phone, an electronic book reader, a desktop PC, a laptop PC, a netbook computer, a work station, a server, a PDA, a portable multimedia player (PMP), an MP3 player, a wearable device, or the like.

The processor chip 100, as an apparatus provided with a display (not shown), may be configured to perform a neural network processing on contents and may be an apparatus that displays an image processed content according to neural network processing through a display. Further, the processor chip 100 may not have a separate display and may be an apparatus performing neural network processing on content. In this example, the processor chip 100 may provide the image processed content according to neural network processing to a display apparatus.

The memory 110 may be electrically connected with a first processor 120, a second processor 130 and a third processor 140, and may store data necessary for the various embodiments of the present disclosure. For example, the memory 110 may be implemented, for example, and without limitation, as an internal memory of a ROM (for example, electrically erasable programmable read-only memory (EEPROM)), a RAM or the like included in each of the first processor 120, the second processor 130 and the third processor 140, or implemented as a memory separate from the first processor 120, the second processor 130 and the third processor 140. The memory 110 may be implemented in the form of an embedded memory in the processor chip 100 according to the data storage use or in the form of a detachable memory in the processor chip 100. For example, in the case of data for driving the processor chip 100, the data may be stored in the embedded memory in the processor chip 100, and in the case data for an expansion function of the processor chip 100, the data may be stored in detachable memory in the processor chip 100. The embedded memory in the processor chip 100 may, for example, and without limitation, be implemented in at least one from a volatile memory (ex: dynamic RAM (DRAM), static RAM (SRAM), or synchronous dynamic RAM (SDRAM), etc.) or a non-volatile memory (ex: one time programmable ROM (OTPROM), programmable ROM (PROM), erasable and programmable ROM (EPROM), electrically erasable and programmable ROM (EEPROM), mask ROM, flash ROM, flash memory (ex: NAND flash or NOR flash, etc.), hard drive, solid state drive (SSD)), or the like, and the detachable memory in the processor chip 100 may be implemented, for example, and without limitation, in the form of a memory card (for example, compact flash (CF), secure digital (SD0, micro secure digital (Micro-SD), mini secure digital (Mini-SD), extreme digital (xD), multi-media card (MMC), etc.), an external memory (for example, USB memory) capable of connecting to a USB port, and the like.

The memory 110 may store an artificial intelligence model used for performing neural network processing on data. For example, the artificial intelligence model, as a model for upscaling the resolution of the input content to 8K, may be a model learning the relationship of the original image (8K) and the downscaled image (ex: 4K) of the original image using, for example, and without limitation, a convolution neural network (CNN). Herein, CNN may refer, for example, to a multilayered neural network having specialized connecting structure designed for voice processing, image processing and the like.

However, the above is only an example embodiment, and the artificial intelligence model may be a model based on various neural networks such as, for example, and without limitation, a recurrent neural network (RNN), deep neural network (DNN), and the like.

Further, the memory 110 may store data, which may be applied with an artificial intelligence model. For example, the memory 110 may store content, which may be applied with an artificial intelligence model.

The memory 110 may include a secure area and an unsecure area. The secure area may be an area that stores data requiring security, and the unsecure area may be an area that stores data unrelated to security. For example, the artificial intelligence model may be stored in the unsecure area, and the content to be applied with the artificial intelligence model may be stored in the secure area.

However, the present disclosure is not limited thereto, and the artificial intelligence model may be stored in a secure area if, for example, security is required. Further, the data to be applied with an artificial intelligence model may be stored in the unsecure area if, for example, unrelated to security.

The secure area and the unsecure area of the memory 110 may be divided in terms of software. For example, a second processor 130 may be electrically connected with the memory 110, but may not recognize the secure area corresponding to, for example, and without limitation, 30% of the memory in terms of software.

However, the present disclosure is not limited thereto, and the secure area of the memory 110 may be implemented to a first memory, and the unsecure area of the memory 110 may be implemented to a second memory. For example, the secure area and the unsecure area of the memory 110 may be divided in terms of hardware.

The first processor 120 and the third processor 140 to be described hereafter may include various processing circuitry and access the secure area and the unsecure area of the memory 110, but the second processor 130 may include various processing circuitry and be unable to access the secure area of the memory 110, and may, for example, only be able to access the unsecure area.

The first processor 120 may be a processor performing neural network processing. For example, the first processor 120, may, for example, include a neural network processing exclusive processor such as a neural processing unit (NPU), may include a plurality of processing elements. Between the adjacent processing elements, a unidirectional shift or a bidirectional shift of data may be possible.

Each of the processing elements may, for example, and without limitation, generally include a multiplier and an arithmetic logic unit (ALU), and the ALU may include, for example, and without limitation, at least one or more adder. The processing element may use a multiplier and ALU to perform four fundamental arithmetical operations. However, the processing elements are not limited thereto, and may include other structures capable of performing functions such as four fundamental arithmetical operations and shifts. Further, each of the processing elements may include, for example, a register for storing data.

The first processor 120 may include various processing circuitry including, for example, a controller controlling a plurality of processing elements, and the controller may control the plurality of processing elements to process in parallel processing as may be required in neural network processing process.

The first processor 120, under control of the second processor 130 or the third processor 140, may perform neural network processing. For example, the first processor 120 may perform neural network processing on data based on information on data provided by the second processor 130 or the third processor 140 and the artificial intelligence model information stored in the unsecure area. Herein, the data may be data stored in the secure area or data stored in the unsecure area. For example, the first processor 120 may access the secure area.

The second processor 130 may include various processing circuitry and may generally control the operations of the processor chip 100, and may, for example, be a processor that operates based on an operating system. However, the second processor 130 may be unable to access the secure area of the memory 110 and may, for example, only access the unsecure area.

According to an embodiment, the second processor 130 may be implemented as various processing circuitry, such as, for example, a microprocessor, a time controller (TCON), or the like. However, the second processor is not limited thereto, and may include, for example, and without limitation, one or more of a central processing unit (CPU), Micro Controller Unit (MCU), Micro processing unit (MPU), controller, application processor (AP), communication processor (CP), ARM processor, or the like, or may be defined by the corresponding terms. Further, the second processor 130 may be implemented as a System on Chip (SoC) integrated with a processing algorithm, a large scale integration (LSI), or in the form of a field programmable gate array (FPGA). For example, the second processor 130 may include a general-purpose processor.

The second processor 130 may transmit a control signal to the first processor 120 and the third processor 140 to cause the first processor 120 and the third processor 140 to perform operations.

The second processor 130 may transmit a start signal to the third processor 140 to cause the third processor 140 to provide information on the input content stored in the memory 110 to the first processor 120. For example, the second processor 130 may transmit a start signal to the third processor 140 to cause the third processor 140, capable of accessing the secure area, to identify address information of input content by accessing the secure area, and to provide address information of input content to the first processor 120. For example, based on the second processor 130 not being able access the secure area, the third processor 140, capable of accessing the secure area, may be controlled to provide address information of the input content stored in the secure area to the first processor 120.

The third processor 140, unlike the second processor 130, as a processor that may control, a part of the operations of the processor chip 100 according to necessity, may be a processor performing only predetermined operations, but is not limited thereto. For example, the third processor 140 may include, for example, a processor incapable of the operations changing arbitrarily. For example, the third processor 140 may be a processor exclusively for signal processing such as digital signal processor (DSP), graphics processing unit (GPU), and the like, or may be a processor performing image processing on input content according to necessity.

In addition, the second processor 130 may transmit an initializing signal to the first processor 120 to cause the first processor to perform neural network processing on input content based on information on input content provided from the third processor 140 and artificial intelligence model information stored in the memory. For example, the second processor 130 may transmit an initializing signal to the first processor 120 to cause the first processor 120 to perform neural network processing on input content based on address information of input content provided from the third processor 140 and artificial intelligence model information stored in the unsecure area.

The second processor 130, may provide address information on one from the plurality of artificial intelligence models stored in the unsecure area to the first processor 120, and the first processor 120 may obtain artificial intelligence model information based on address information of artificial intelligence model provided from the second processor 130.

For example, the second processor 130, based on performing 8K upscaling on the input content, may control the third processor 140 to identify address information of input content by accessing the secure area and provide address information of input content to the first processor 120. Further, the second processor 130 may identify the address information of the artificial intelligence model performing 8K upscaling by accessing the unsecure area and may provide address information of the artificial intelligence model to the first processor 120. Further, the first processor 120 may perform control for performing neural network processing on input content based on address information of the input content provided from the third processor 140 and the address information of the artificial intelligence model.

In addition, the second processor 130 may transmit a start signal to the third processor 140 to cause the third processor 140 to provide address information on one from the plurality of artificial intelligence models stored in the unsecure area based on the input content to the first processor 120, and the first processor 120 may obtain the artificial intelligence model information based on the address information of the artificial intelligence model provided from the third processor 140.

For example, the third processor 140 may analyze the input content and identify the type of image processing necessary to the input content. The third processor 140, based on the resolution of the input content being lower than the resolution of the display, may identify address information of the artificial intelligence model performing the upscaling, and based on the quality being low despite resolution of the input content and the resolution of the display being identical, may identify the address information of the artificial intelligence model removing noise of the image.

For example, the address information of the artificial intelligence model may be provided to the second processor 130, or may be provided after the third processor 140 analyzes the input content. As the second processor 130 may be unable to analyze the input content stored in the secure area, the artificial intelligence model provided by the second processor 130 may be an artificial intelligence model corresponding to user selection. For example, the second processor 130, based on the user wanting to play the input content to cinema mode, may identify address information of the artificial intelligence model corresponding to cinema mode.

However, the disclosure is not limited thereto, and the second processor 130 may identify surrounding environment information using a sensor and address information of the artificial intelligence model corresponding to surrounding environment information may be identified.

The processor chip 100 further includes a communication interface (e.g., including communication circuitry) (not shown), and a plurality of frames included in the input content that may be sequentially received through the communication interface and stored in the secure area of the memory 110, and the second processor 130 may transmit a start signal to cause the third processor 140 to provide address information of the frame sequentially stored in the memory 110 to the first processor 120 at predetermined time intervals.

The communication interface may include various communication circuitry and may be configured to perform communication with various types of external apparatuses based on various types of communication methods. The communication interface may include, for example, and without limitation, a tuner receiving RF broadcast signals by tuning a channel selected by the user or all channels pre-stored from radio frequency (RF) broadcast signals received through an antenna. In this example, the processor chip 100 may receive and demodulate a digital IF (DIF) signal converted from the tuner, and may further include a demodulator performing channel decoding or the like. Further, the communication interface may include various configurations including various circuitry for performing wireless communication such as a WiFi chip, a Bluetooth chip, a wireless communication chip, and an NFC chip. A WiFi chip and a Bluetooth chip may perform communication through a WiFi method and a Bluetooth method, respectively. Based on a WiFi chip or a Bluetooth chip being used, various connection information such as SSID and session key may be first transmitted and received, and various information may be transmitted and received after connecting by communication using the above. A wireless communication chip may refer, for example, to a chip performing communication according to various communication protocols such as IEEE, ZigBee, 3rd Generation (3G), 3rd Generation Partnership Project (3GPP), and Long Term Evolution (LTE). An NFC chip refers to a chip that operates by a near field communication (NFC) method using a 13.56 MHz band from various RF-ID frequency bands such as 135 kHz, 13.56 MHz, 433 MHz, 860-960 MHz, and 2.45 GHz. Further, the communication interface may also include the configuration of performing a wire communication such as HDMI, MHL, USB, DP, thunderbolt, RGB, D-SUB, and DVI. For example, the processor chip 100 may receive a content playback screen from an external apparatus through the communication interface or transmit the content playback screen to the external apparatus through the communication interface.

The second processor 130, based on a first application being executed, may transmit a start signal to the third processor 140 to cause the third processor 140 to provide information on the input content to the first processor 120.

In addition, the second processor 130, based on the first application being terminated, may transmit an end signal to the third processor 140 to cause the third processor 140 to terminate the provided operations, and the third processor 140 may perform control to cause the first processor 120 to terminate neural network processing operation and may provide a signal indicating the neural network processing operation is terminated to the second processor 130.

The second processor 130, based on the second application being executed, may access the unsecure area to identify address information of the data corresponding to the second application and may provide the identified address information to the first processor 120, and the first processor 120 may perform control to perform neural network processing on data based on address information of data provided from the second processor 130 and the artificial intelligence model information stored in the unsecure area.

The first application may, for example, be an application related to image processing of content, and the second application may, for example, be an application unrelated to content.

For example, the second processor 130, based on the first application related to image processing of content being executed, may control the third processor 140 to obtain address information of content stored in the secure area, and based on the second application unrelated to content being executed, may directly obtain address information of data stored in an unsecure area.

The processor chip 100 may further include a display (not shown), and the second processor 130 may transmit a start signal to the third processor 140 to cause the third processor 140 to identify address information of input content displayed through a display from a plurality of input contents, and to provide the identified address information to the first processor 120.

For example, the processor chip 100 may receive, for example, a first input content from an external apparatus connected to a high-definition multimedia interface (HDMI), a second input content from the broadcast station through a tuner, and may store the first input content and the second input content in the secure area. In this example, the second processor 130 may transmit a start signal to the third processor 140 to cause the third processor 140 to identify address information of input content displayed through the display from the first input content and the second input content, and to provide the identified address information to the first processor 120.

The display may be implemented as displays of various types such as, for example, and without limitation, a liquid crystal display (LCD), organic light emitting diodes (OLED) display, a plasma display panel (PDP), or the like. The display may also include driving circuit, backlight unit, or the like capable of being implemented in forms such as an a-si TFT, a low temperature poly silicon (LTPS) TFT, and an organic TFT (OTFT) therein. The display may be implemented in touch screen by coupling with a touch sensor.

The second processor 130, after initializing the first processor 110, may transmit a start signal to the third processor 140 to cause the third processor 140 to identify address information of input content accessing the secure area and to provide the identified address information to the first processor 120.

Although in the above the second processor 130 or the third processor 140 has been described as providing address information to the first processor 120, the present disclosure is not limited thereto. For example, the second processor 130 or the third processor 140 may obtain an input content or artificial intelligence model and may provide to the first processor 120 directly.

As described above, the problem of the second processor 130 being unable to access the secure area may be addressed by a method of using the third processor 140 capable of accessing the secure area.

Below, example operations of each processor will be described in greater detail with reference to the drawings.

Figure 3:
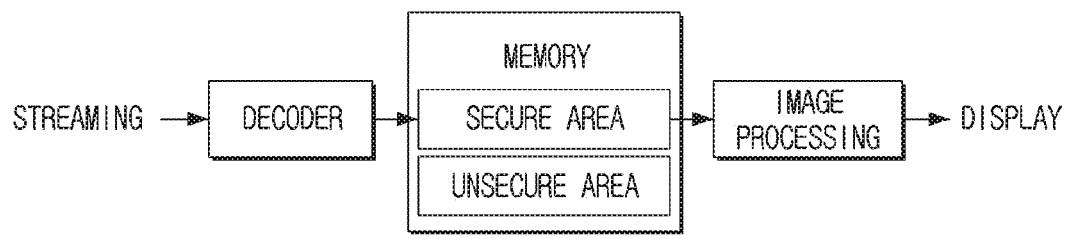
FIG. 3 is a diagram illustrating an example secure area and an unsecure area of a memory according to an embodiment of the present disclosure.

FIG. 3 is a diagram illustrating an example secure area and unsecure area of a memory 110 according to an embodiment of the present disclosure. Referring to FIG. 3, the second processor 130 operates such that it is possible to store and display input content even if access to the secure area of the memory 110 is not possible.

The processor chip 100 may receive input content. In FIG. 3, the receiving of input content is shown, for example, as streaming, and this may refer, for example, to the input content being received in real-time. Further, not only is the input content indicated as streaming through the internet, receiving content from an external apparatus through a wire connection may also be indicated as streaming.

The processor chip 100 may receive encoded input content from the outside, and may decode the input content through a decoder (e.g., including decoding circuitry and/or executable program elements). Further, the decoded content may be stored in the secure area of the memory 110.

The decoded content, based on the provided source, may be stored in different areas within the secure area. For example, based on the decoded content being received through the tuner, the decoded content may be stored in a first area of the secure area, and based on the decoded content being received from an external apparatus connected through HDMI, the decoded content may be stored in a second area of the secure area. For example, the secure area may be divided into a plurality of areas divided by the provided sources of the content, and the third processor 140 may identify information on the divided plurality of areas of the secure area.

The content stored in the secure area may be displayed after image processing. The image processing may be performed by a digital circuit such as, for example, and without limitation, a register-transfer level (RTL), the first processor 120, or the third processor 140. A digital circuit such as a register-transfer level (RTL) may be used when possibility of change is low, and the third processor 140 may be used when the possibility of change is high. For example, even in the case of a complex algorithm (FRC), based on modes of predetermined number existing (ex: 30 Hz, 60 Hz, 120 Hz), being implemented to digital circuits such as RTL is possible, and in this case may be advantageous from a power and production cost aspect rather than using the third processor 140. In the case of an algorithm (ex: game mode, automatic screen adjustment according to surrounding brightness) where there are many changing elements by the user or there are many changing elements existing by use type (area), there is a high possibility of not being used regularly when implemented as a digital circuit such as RTL, and there may be the problem of taking up space within the chip. In this case, using the third processor 140 may be more advantageous rather than using a digital circuit such as RTL. Further, the first processor 120 may perform image processing using the artificial intelligence model.

The above-described operations such as streaming, decoding, and storing may be implemented through a digital circuit. The second processor 130 may control each digital circuit and may perform processing on input content, but direct access to the input content is not allowed. For example, even if the second processor 130 is unable access to the secure area, the operations of displaying the input content may be performed.

Figure 4A:
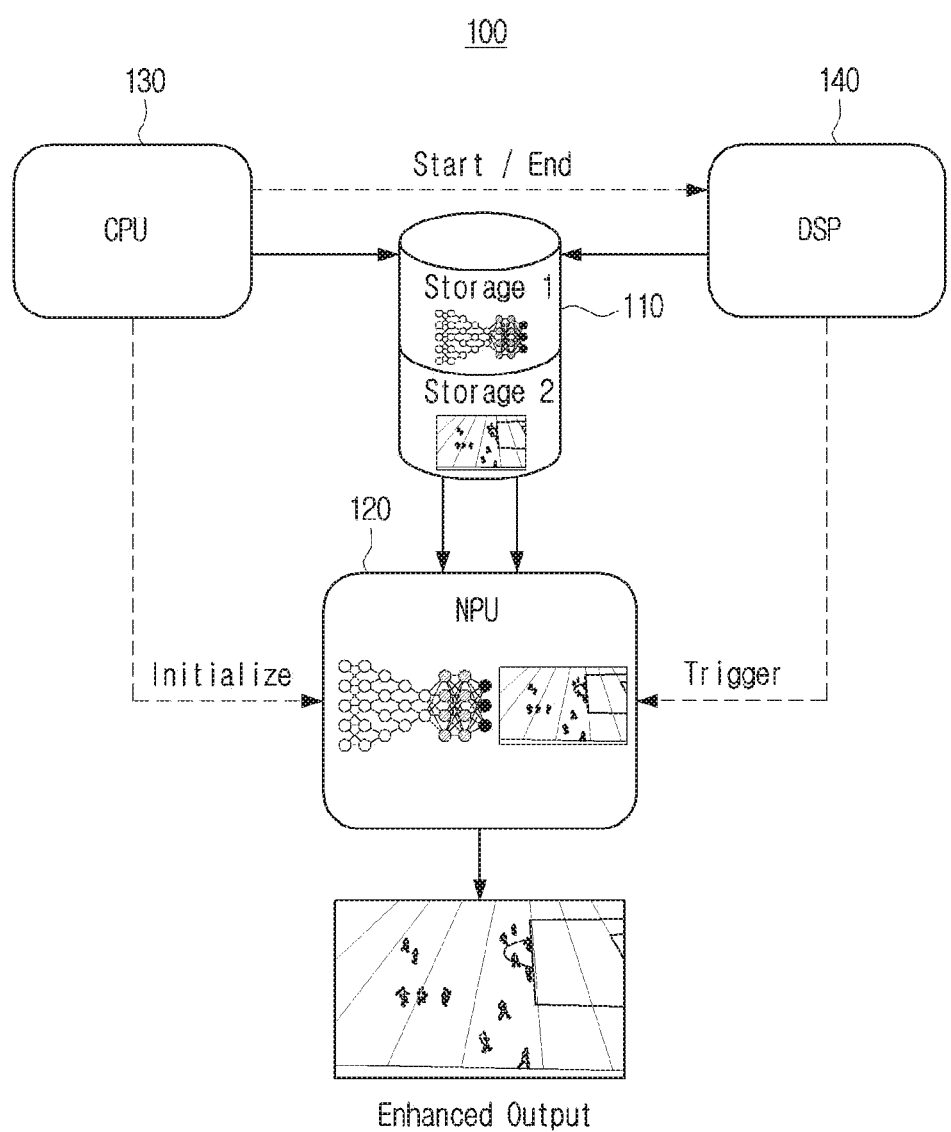
FIGS. 4A and 4B are diagrams illustrating example neural network processing according to an embodiment of the present disclosure.
Figure 4B:
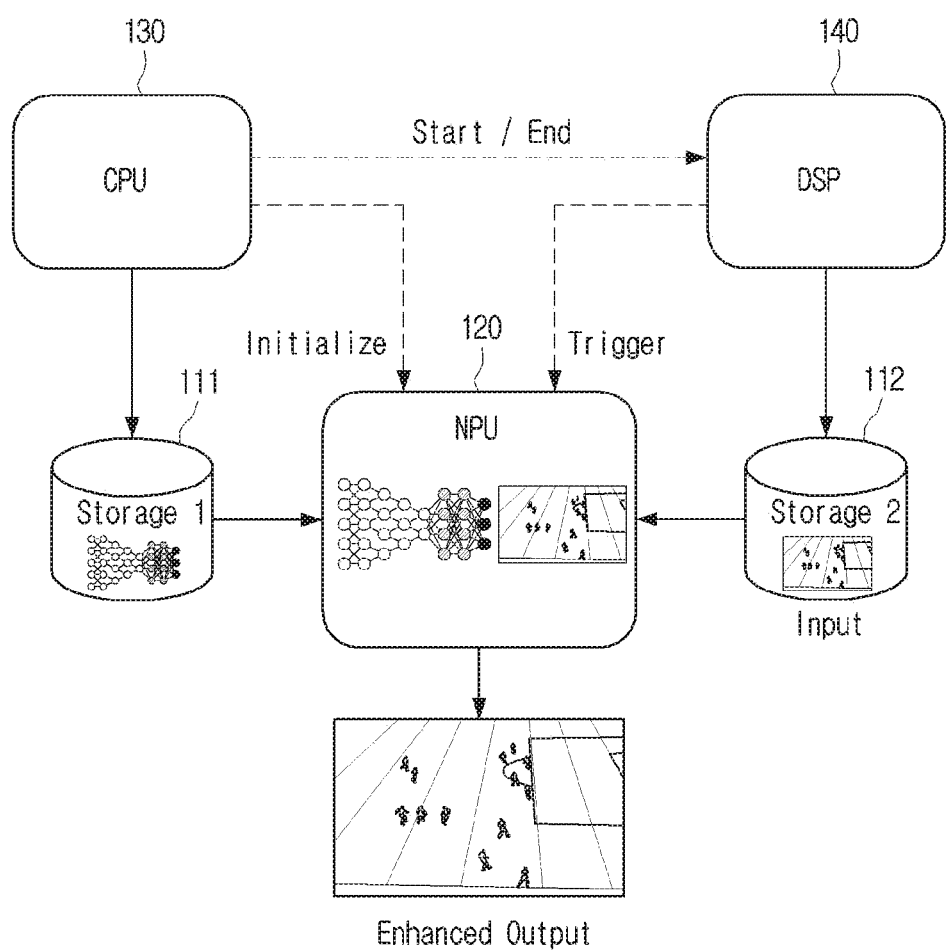

FIGS. 4A and 4B are diagrams illustrating example neural network processing according to an embodiment of the present disclosure.

As shown in FIG. 4A, the second processor (CPU) 130 may perform booting using an operating system (O/S), and may perform various operations such as control through various menu input by the user and performing applications using various programs, contents, data or the like stored in the unsecure area (Storage 1).

The second processor 130 may be able access the unsecure area, but may be unable to access the secure area (Storage 2). Data that requires security such as content copyright (DRM) or private information such as input content received from outside the processor chip 100 may be stored in the secure area, and the second processor 130 may not read the data requiring security.

The third processor 140, as, for example, a processor that may independently perform digital signal processing, may not us an O/S, and may use a pre-stored program to perform the predetermined operations. Accordingly, the third processor 140 may access the secure area storing the data requiring security.

The first processor 120, as a processor that may be used for neural network processing, may not use an O/S, and may be able to access the secure area.

Based on the second processor 130 being unable to identify address information of the input content, the third processor 140 may be controlled to perform neural network processing on input content.

The second processor 130 may perform initializing of the first processor 120. A reason that the second processor 130 may initialize the first processor 120 may be that the second processor 130 controls the TV system through the O/S. The O/S manages resources on each program through the driver, and this is an effective system to managing resource such as the memory 110. For example, the second processor 130 may effectively manage the resource by initializing the first processor 120 through the driver.

Thereafter, the second processor 130 may control the third processor 140 to identify address information of the input content by accessing the secure area and to provide address information of the input content to the first processor 120. The control operations of the third processor 140 by the second processor 130 may, for example, include be a one-time control operation.

The third processor 140 may control for the first processor 120 to perform neural network processing on input content based on address information of input content provided from the third processor 140 and the artificial intelligence model information stored in the unsecure area. The control operations of the first processor 120 by the third processor 140 may include a control operation that is repeated at predetermined time intervals. For example, the third processor 140, based on the input content being an image of 30 fps, may provide input to the first processor 120 at 33.3 ms intervals and may control the first processor 120 to perform neural network processing.

For example, the third processor 140 may provide address information of each frame for every frame of the input content to the first processor 120, and may control (trigger) to perform neural network processing. However, the present disclosure is not limited thereto, and the third processor 140 may obtain each frame of the input content, provide the obtained frame to the first processor 120, and may control to perform neural network processing.

The artificial intelligence model used when performing neural network processing by the first processor 120 may be provided by the second processor 130. Herein, the artificial intelligence model may be stored in the unsecure area, and the second processor 130 may access the unsecure area to provide address information of the artificial intelligence model to the first processor 120.

Based on the above-described operations, the third processor 140 and not the second processor 130 may identify address information on the input content, and may control the neural network processing operation of the first processor 120. Accordingly, a neural network processing may be performed in real-time using the first processor 120 while maintaining security of the input content and reducing the processing burden of the second processor 130.

In FIG. 4A, the memory 110 is described as including a secure area and an unsecure area, but is not limited thereto. For example, as shown in FIG. 4B, the processor chip 100 may include a first memory 111 and a second memory 112 divided, for example, in terms of hardware. The first memory 111, as a memory storing non-secure data, may be a memory that is accessible by the second processor 130. The second memory 112, as a memory storing secure data, may be a memory that is not accessible by the second processor 130. The first processor 120 and the third processor 140 may access the first memory 111 and the second memory 112. The operations of FIG. 4B, other than the memory being divided in terms of hardware, is identical to or similar to the operations of FIG. 4A, and thus the overlapping description thereof may not be repeated here.

Figure 5A:
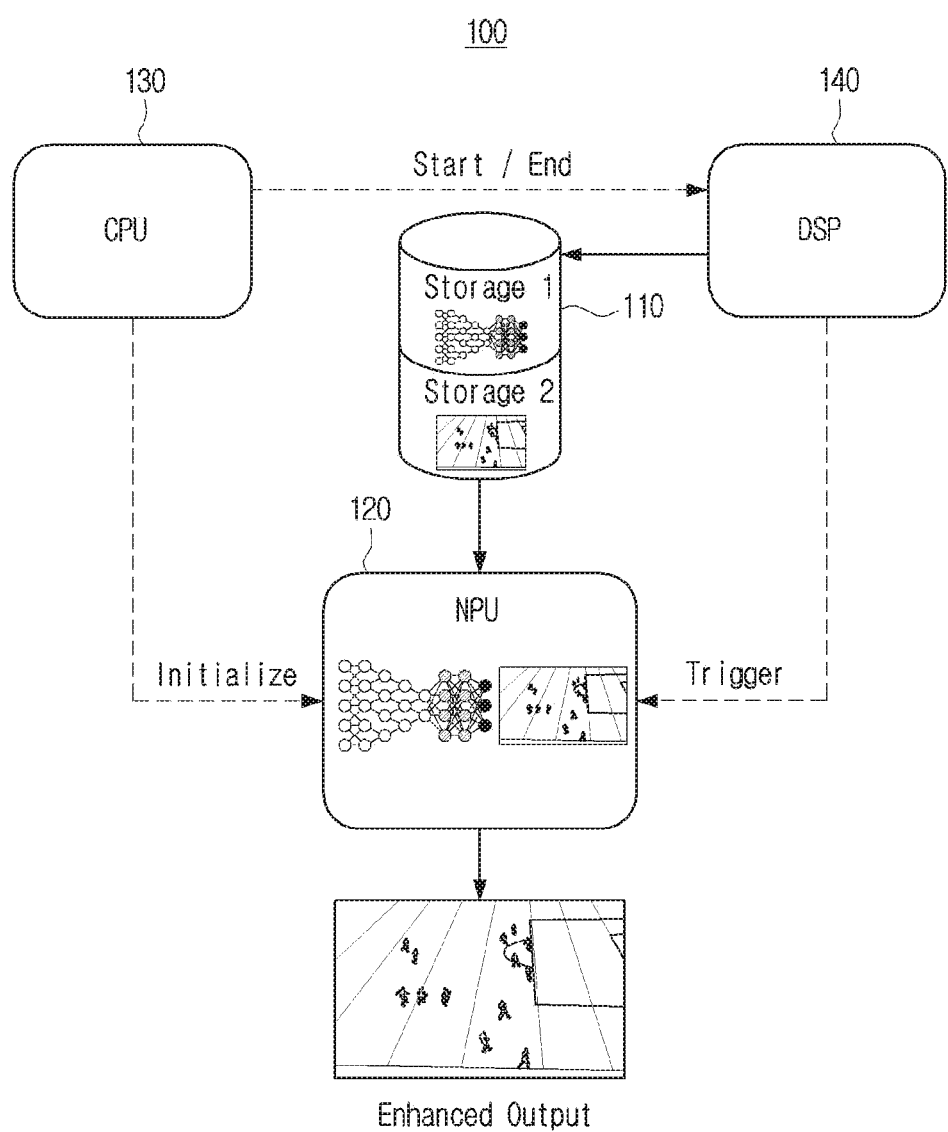
FIGS. 5A and 5B are diagrams illustrating example neural network processing according to another embodiment of the present disclosure.
Figure 5B:
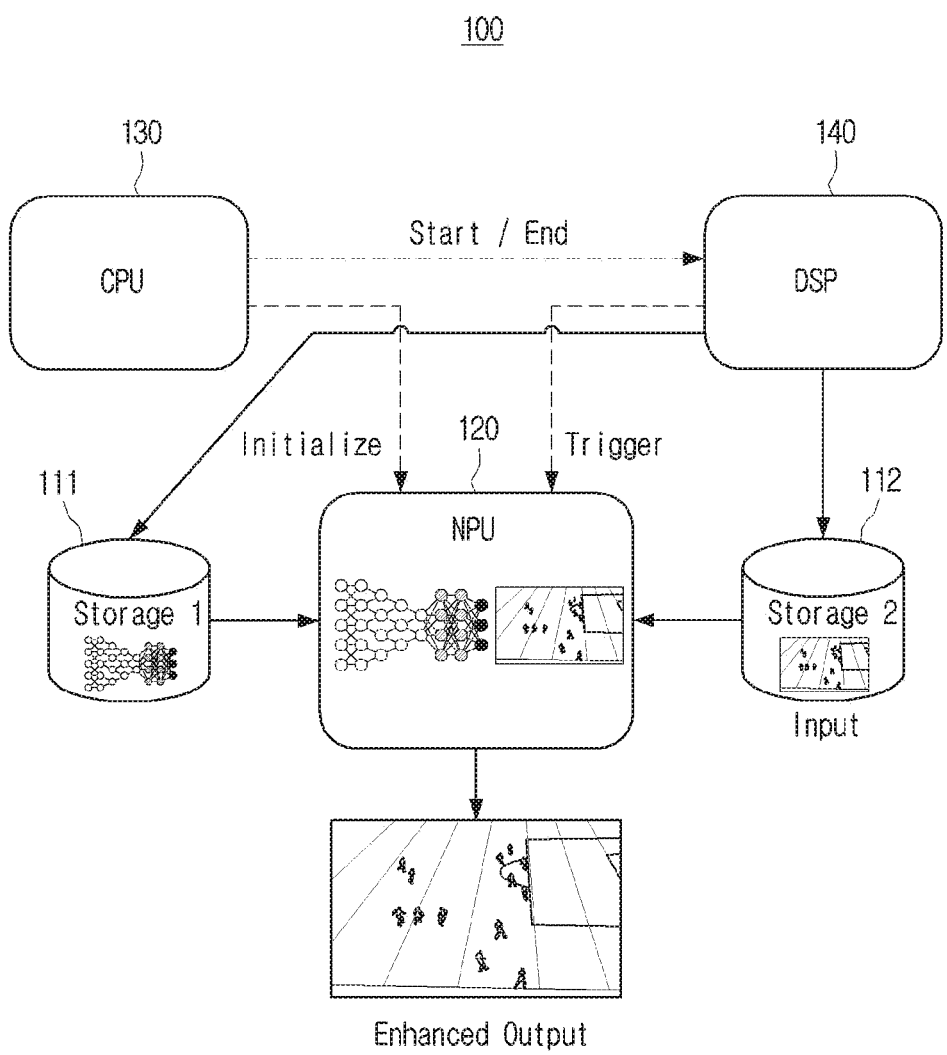

FIGS. 5A and 5B are diagrams illustrating example neural network processing according to another embodiment of the present disclosure.

FIG. 5A is virtually similar to the operations of FIG. 4A, but is a diagram illustrating an example case in which the subject identifying the address information of the artificial intelligence model and providing the address information to the first processor 120 is the third processor 140.

The third processor 140, unlike the second processor 130, may access the input content stored in the secure area (Storage 2), and thus an analysis of the input content is possible. Accordingly, the third processor 140 may identify the artificial intelligence model optimized to the input content. For example, the third processor 140 may identify address information of the artificial intelligence model to remove noise from the unsecure area if the noise of the input content is determined problematic and may identify address information of the artificial intelligence model for extending resolution in the unsecure area (Storage 1). The third processor 140 may provide address information of the artificial intelligence model to the first processor 120.

The memory 110 in FIG. 5A is described as including a secure area and an unsecure area, but is not limited thereto. For example, as shown in FIG. 5B, the processor chip 100 may include a first memory 111 and a second memory 112 divided, for example, in terms of hardware, and the specific description thereof overlapping with FIG. 4B may not be repeated here.

Figure 6A:
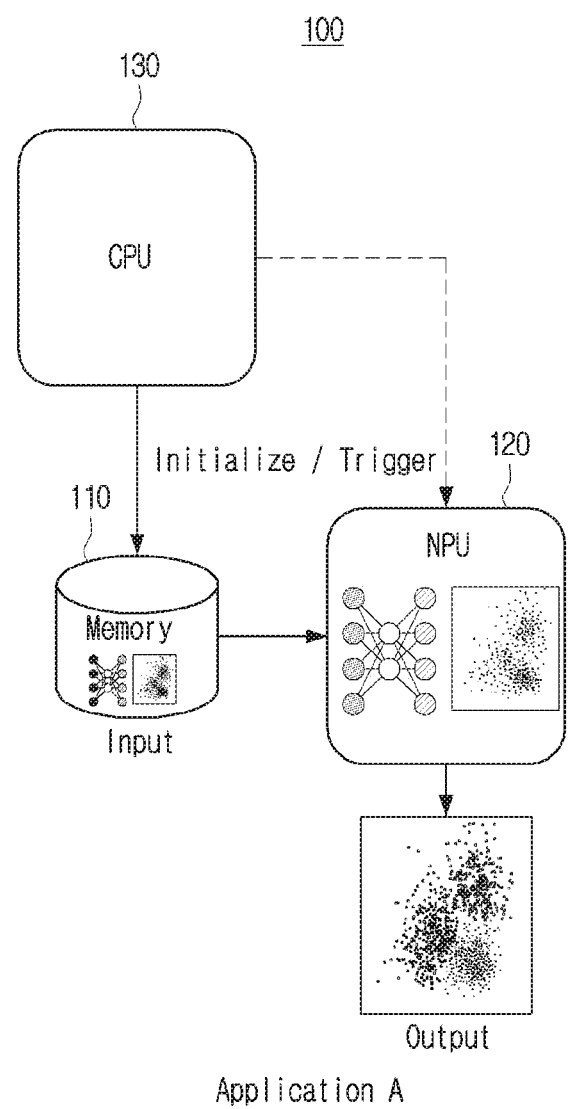
FIGS. 6A, 6B and 6C are diagrams illustrating example operations based on an application according to an embodiment of the present disclosure.
Figure 6B:
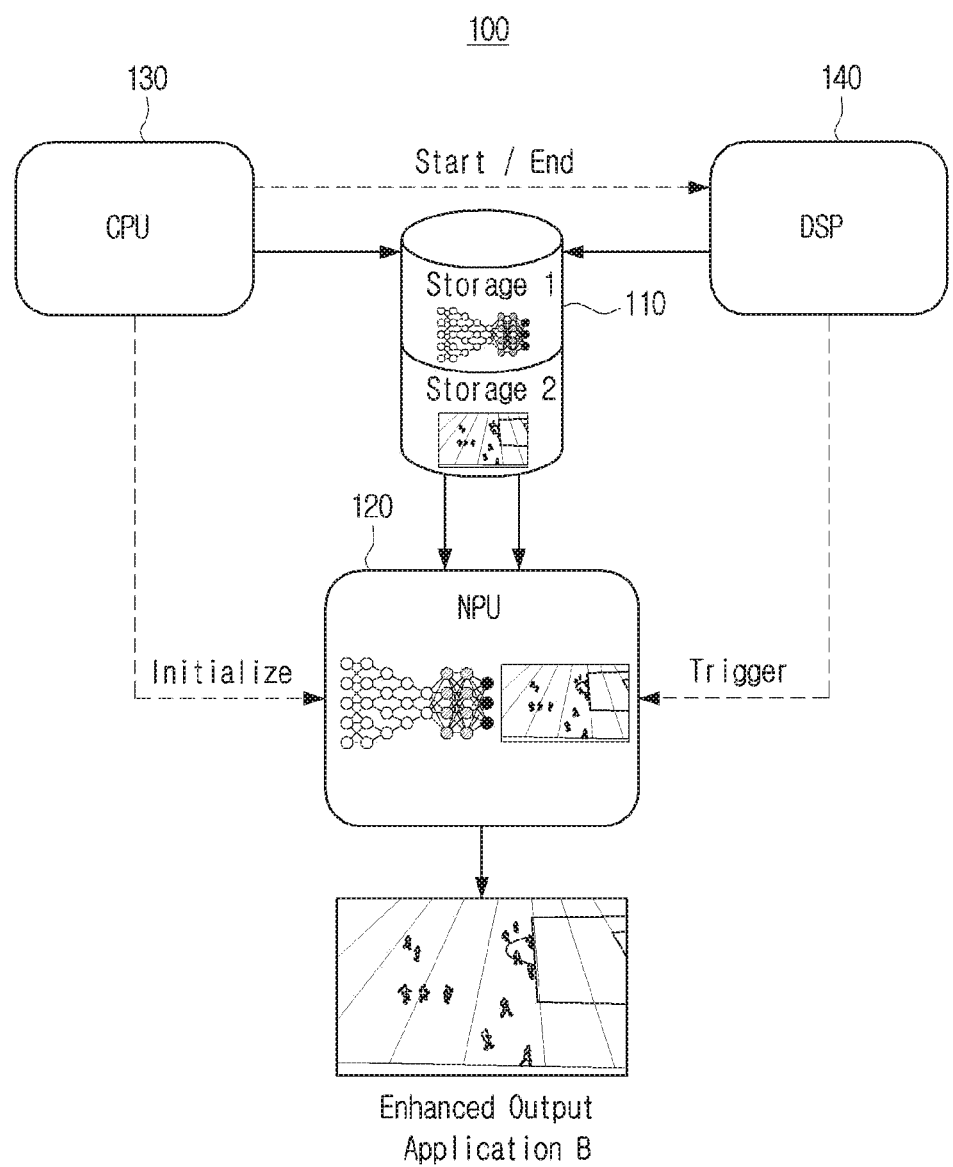
Figure 6C:
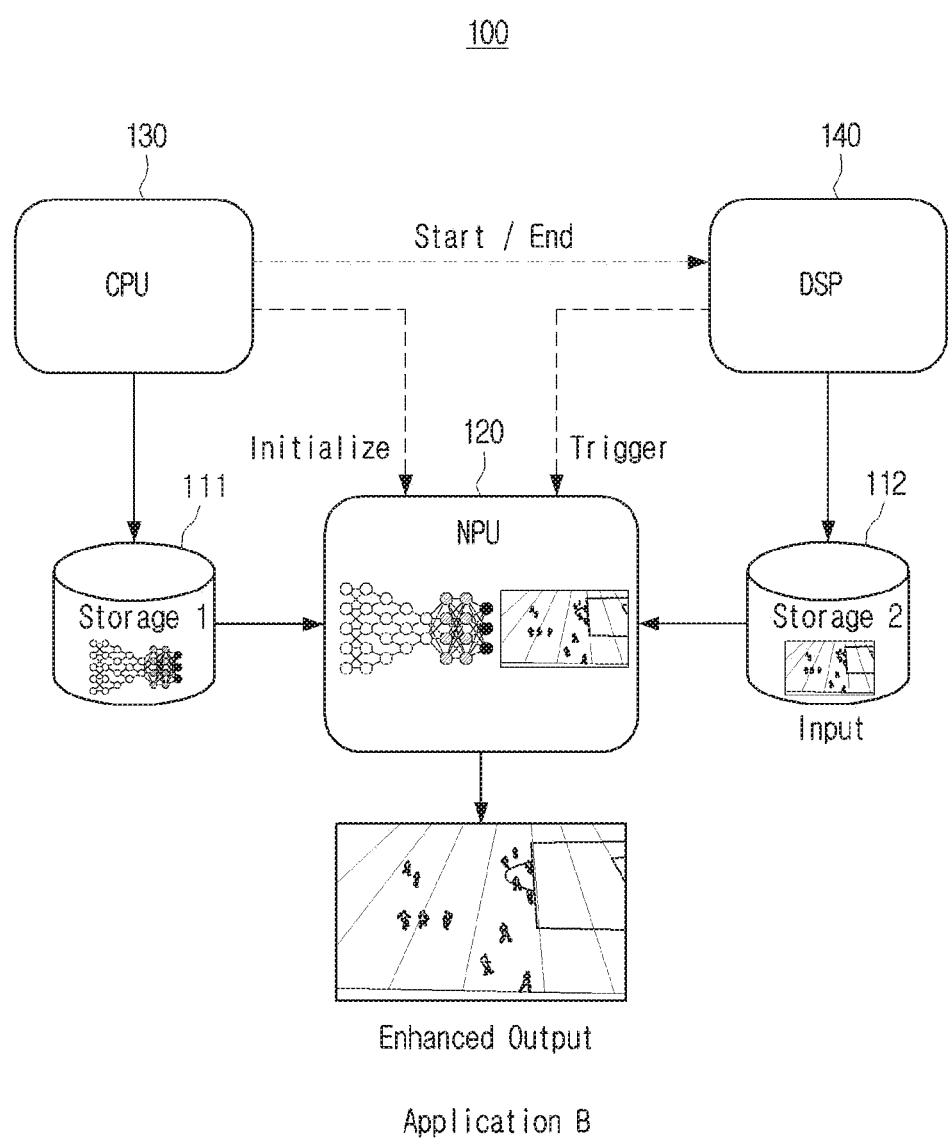

FIGS. 6A, 6B and 6C are diagrams illustrating example operations based on an application according to an embodiment of the present disclosure.

As shown in FIG. 6A, based on application A unrelated to the input content being executed, the second processor 130 may provide information on data stored in the memory 110 and information on the artificial intelligence model to the first processor 120. The second processor 130 may control for the first processor 120 to perform neural network processing on data based on the provided information. For example, based on application A unrelated to the input content being executed, the second processor 130 may identify a first address information of data stored in the unsecure area and a second address information of the artificial intelligence model, and may provide the first address information and the second address information to the first processor 120. The second processor 130 may control the first processor 120 to perform neural network processing on data based on the first address information and the second address information.

For example, application A may be an application that receives ambient illuminance value sensed through a sensor as input processing the most appropriate brightness. The ambient illuminance value may not be data requiring security and thus may be stored in the unsecure area. The second processor 130 may identify the first address information of ambient illuminance value and the second address information of the artificial intelligence model corresponding to application A, and may provide the first address information and the second address information to the first processor 120. The second processor 130 may control the first processor 120 to process the most appropriate brightness corresponding to the ambient illuminance value based on the first address information and the second address information.

For example, in this case, the second processor 130 may not have to use the third processor 140.

Thereafter, based on application A such as FIG. 6B being terminated and application B, which image processes input content, being executed, the second processor 130 may control the third processor 140 to provide information on input content stored in the memory 110 to the first processor 120.

For example, based on application A being terminated and application B, which image processes input content, being executed, the second processor 130 may control the third processor 140 to identify address information of input content by accessing the secure area (Storage 2), and provide address information of the input content to the first processor 120.

The third processor 140 may control the first processor 120 to perform neural network processing on input content based on information on input content provided from the third processor 140 and the artificial intelligence model information stored in the unsecure area (Storage 1).

For example, the third processor 140 may control the first processor 120 to perform neural network processing on input content based on address information of input content provided from the third processor 140 and the artificial intelligence model information stored in the unsecure area (Storage 1). For example, the third processor 140 may perform image processing through the first processor 120 by reading input content received at predetermined intervals from the secure area, and then repeating the operations of storing in the secure area.

For example, in this case, the second processor 130, after initializing the first processor 120, may delegate operations thereafter to the third processor 140.

For example, the second processor 130 may be a processor that controls the overall operations of the processor chip 100, but as the third processor 130 is a processor only used in necessary cases, the third processor 140 may be more advantageous in image processing in real time.

In FIG. 6B, the memory 110 is described as including a secure area and an unsecure area, but is not limited thereto. For example, as shown in FIG. 6C, the processor chip 100 may include a first memory 111 and a second memory 112 divided in terms of a hardware, and the specific description thereof overlapping with FIG. 4B may not be repeated here.

Figure 7:
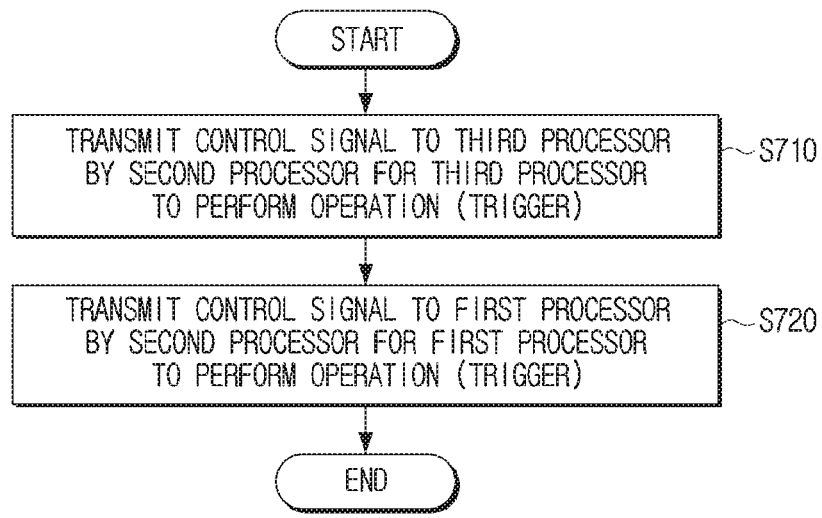
FIG. 7 is a flowchart illustrating an example method of controlling a processor chip according to an embodiment of the present disclosure.

FIG. 7 is a flowchart illustrating an example method of controlling a processor chip according to an embodiment of the present disclosure.

A method of controlling a processor chip including a memory, a first processor performing neural network processing on data stored in the memory, a second processor and a third processor includes the second processor transmitting a control signal to the third processor to cause the third processor to perform an operation (S710). Further, a control signal may be transmitted to the first processor by the second processor to cause the first processor to perform an operation (S720).

Transmitting a control signal to the third processor (S710) may include transmitting a start signal to the third processor to cause the third processor to provide information on input content stored in the memory to the first processor, and transmitting a control signal to the first processor (S720) includes transmitting an initializing signal to the first processor to cause the first processor to perform neural network processing on input content based on information on input content provided from the third processor and the artificial intelligence model information stored in the memory.

Further, transmitting a control signal to the third processor (S710) may include identifying address information of input content by accessing the secure area of the memory, and transmitting a start signal to the third processor to provide address information of input content to the first processor, and transmitting a control signal to the first processor (S720) includes transmitting an initializing signal to the first processor to cause the first processor to perform neural network processing on input content based on address information of input content provided from the third processor and the artificial intelligence model information stored in the unsecure area of the memory.

The providing address information on one from a plurality of artificial intelligence models stored in the unsecure area to the first processor by the second processor and obtaining the artificial intelligence model information based on address information of the artificial intelligence model provided from the second processor by the first processor may be further included.

Further, transmitting a control signal to the third processor (S710) may include transmitting a start signal to the third processor to cause the third processor to provide address information on one of the plurality of artificial intelligence models stored in the unsecure area based on input content, and the control method may further include the first processor obtaining artificial intelligence model information based on address information of artificial intelligence model provided from the third processor.

Sequentially receiving a plurality of frames included in the input content and storing in the secure area of the memory may further be included, and transmitting a control signal to the third processor (S710) may include transmitting a start signal to the third processor for the third processor to provide address information of frames sequentially stored in the memory at predetermined time intervals to the first processor.

Further, transmitting a control signal to the third processor (S710) may include, based on a first application being executed, transmitting a start signal to the third processor to cause the third processor to provide information on the input content to the first processor.

Based on the first application being terminated, transmitting an end signal to the third processor by the second processor to cause the third processor to terminate the provided operations, terminating neural network processing operation by the first processor under the control of the third processor, and providing a signal indicating neural network processing operation is terminated by the third processor to the second processor may be further included.

According to the various example embodiments of the present disclosure such as the above, the processor chip may, for example, use a DSP rather than a CPU to perform neural network processing on original content to reduce memory use, improve output quality of content, and perform processing in real-time.

In the above, the memory, the first processor, the second processor and the third processor are described as being implemented in a processor chip for the sake of convenience and ease of description, but is not limited thereto. For example, an electronic apparatus may, for example, and without limitation, be implemented as including a memory, CPU, DSP and NPU as a separate configuration.

According to an embodiment, the various example embodiments described above may be implemented as a software including instructions stored on machine-readable storage media readable by a machine (e.g.: computer). The machine, as an apparatus capable of calling an instruction stored in a storage medium and operating according to the called instruction, may include an electronic device (e.g.: electronic apparatus) according to the disclosed embodiments. Based on instructions being executed by the processor, the processor may directly, or using other elements under the control of the processor, perform a function corresponding to the instruction. The instruction may include a code generated by a compiler or a code executable by an interpreter. The machine-readable storage medium may be provided in the form of a non-transitory storage medium. Herein, the 'non-transitory' storage medium may not include a signal and is tangible, but does not distinguish data being semi-permanently or temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. Play Store™). In the case of on-line distribution, at least a portion of the computer program product may be at least temporarily stored in a storage medium such as a manufacturer's server, a server of an application store, or a memory of a relay server, or temporarily generated.

In addition, according to an embodiment, the various embodiments described above may be implemented in a computer or in a recording medium capable of reading a similar apparatus using a software, a hardware or a combination of software and hardware. In some cases, the embodiments described herein may be implemented as a processor itself. Based on a software implementation, the embodiments according to the process and function described in the present disclosure may be implemented as separate software modules. Each of the software modules may perform one or more function or operations described in the present disclosure.

The computer instructions for performing a processing operations of another apparatus according to the various embodiments described above may be stored in a non-transitory computer-readable medium. The computer instructions stored in this non-transitory computer-readable medium, based on being executed by the processor of a specific device, may have a specific device perform a processing operations of other device according to the various embodiments described above. The non-transitory computer readable medium may refer, for example, to a medium that stores data semi-permanently, and is readable by an apparatus. Examples of a non-transitory computer-readable medium may include a compact disc (CD), a digital versatile disc (DVD), a hard disc, a Blu-ray disc, a universal serial bus (USB), a memory card, a read only memory (ROM), and the like.

In addition, each of the elements (e.g.: a module or a program) according to the various embodiments described above may be composed of a single entity or a plurality of entities, and some sub-elements of the abovementioned sub-elements may be omitted, or another sub-element may be further included in various embodiments. Alternatively or additionally, some elements (e.g.: modules or programs) may be integrated into one entity to perform the same or similar functions performed by each respective element prior to integration. The operations performed by a module, a program, or other element, in accordance with the various embodiments, may be performed sequentially, in a parallel, repetitively, or in a heuristically manner, or at least some operations may be performed in a different order, omitted, or may further include a different operations.

While various example embodiments have been illustrated and described with reference to various figures, the disclosure is not limited to specific embodiments or the drawings, and it will be understood by those of ordinary skill in the art that various changes in form and details may be made therein without departing from the spirit and scope as defined.

What is claimed is:

1. A processor chip configured to perform neural network processing, comprising:
   a neural processing unit (NPU), comprising a processor, configured to perform the neural network processing on data;
   a central processing unit (CPU) comprising a processor;
   a third processor; and
   a memory configured to include a secure area that is accessible by the neural processing unit and is not accessible by the central processing unit, and an unsecure area accessible by the neural processing unit and the central processing unit,
   wherein the central processing unit is configured to control to transmit a start signal to the third processor to cause the third processor to provide address information of one of a plurality of artificial intelligence models stored in the unsecure area included in the memory,
   wherein the third processor is configured to:
      identify the one of the plurality of artificial intelligence models based on a resolution of an input content,
      provide the address information of the one of the plurality of artificial intelligence models to the neural processing unit so that the neural processing unit can perform the neural network processing by accessing the secure area based on the address information.

2. The processor chip according to claim 1, wherein, the central processing unit is configured to:
   transmit an initializing signal to the neural processing unit to cause the neural processing unit to perform the neural network processing on the input content based on address information of the input content provided by the third processor and artificial intelligence model information.

3. The processor chip according to claim 2, wherein the neural processing unit is configured to obtain the artificial intelligence model information based on the address information of the artificial intelligence model provided by the third processor.

4. The processor chip according to claim 2, further comprising:
   a communication interface comprising communication circuitry;
   wherein the processor chip is configured to store a plurality of frames included in the input content and sequentially received through the communication interface in the secure area of the memory, and
   wherein the central processing unit is configured to transmit the start signal to the third processor to cause the third processor to provide address information of the frames sequentially stored in the memory to the neural processing unit at predetermined time intervals.

5. The processor chip according to claim 2, wherein the central processing unit is configured to:
   access the unsecure area included in the memory to identify address information of data corresponding to a second application based on the second application being executed,
   provide the identified address information to the neural processing unit, and
   control the neural processing unit to perform the neural network processing for the data based on address information of the data provided by the central processing unit and the artificial intelligence model information stored in the unsecure area.

6. The processor chip according to claim 1, wherein the central processing unit is configured to transmit the start signal to the third processor to cause the third processor to provide information on the input content to the neural processing unit, based on a first application being executed.

7. The processor chip according to claim 6, wherein the central processing unit is configured to transmit an end signal to the third processor to cause the third processor to stop providing information to the neural processing unit based on the first application being terminated, and
wherein the third processor is configured to control the neural processing unit to stop the neural network processing, and to provide a signal indicating that the neural network processing is stopped to the central processing unit.

8. The processor chip according to claim 1,
wherein the third processor includes a processor performing a predetermined operation.

9. The processor chip according to claim 1, wherein the third processor is configured to identify address information of the input content by accessing the secure area and provide address information of the input content in the secure area to the neural processing unit at predetermined time intervals determined based on the input content.

10. A method of controlling a processor chip comprising a neural processing unit (NPU), a central processing unit (CPU), a third processor, and a memory including a secure area that is accessible by the neural processing unit and is not accessible by the central processing unit and an unsecure area accessible by the neural processing unit and the central processing unit, the method comprising:
transmitting, by the central processing unit, a start signal to the third processor to cause the third processor to provide address information of one of a plurality of artificial intelligence models stored in the unsecure area included in the memory;
based on receiving the start signal, the third processor identifying the one of the plurality of artificial intelligence models based on a resolution of an input content; and
providing, by the third processor, the address information of the one of a plurality of artificial intelligence models to the neural processing unit so that the neural processing unit performs neural network processing by accessing the secure area based on the address information.

11. The method according to claim 10, wherein the method further comprises:
transmitting, by the central processing unit, an initializing signal to the neural processing unit to perform the neural network processing on the input content based on address information of the input content provided from the third processor and artificial intelligence model information.

12. The method according to claim 11, wherein the method further comprises:
obtaining, by the neural processing unit, the artificial intelligence model information based on the address information of the artificial intelligence model provided by the third processor.

13. The method according to claim 11, the method further comprising:
sequentially receiving a plurality of frames included in the input content and stored in the secure area of the memory; and
wherein the transmitting the start signal to the third processor comprises transmitting the start signal to the third processor to cause the third processor to provide the address information of frames sequentially stored in the memory to the neural processing unit at a predetermined time interval.

14. The method according to claim 11, wherein the transmitting the start signal to the third processor comprises transmitting the start signal to the third processor to cause the third processor to provide information on the input content to the neural processing unit based on a first application being executed.

15. The method according to claim 14, the method further comprising:
transmitting, by the central processing unit, an end signal to the third processor to cause the third processor to stop provided operations based on the first application being terminated;
terminating the neural network processing by the neural processing unit under control of the third processor; and
providing, by the third processor, a signal indicating that the neural network processing is terminated to the central processing unit.

* * * * *